Oct. 17, 1967          A. MEYER          3,347,704
METHOD OF METAL-COATING CERAMIC BODIES
Filed Dec. 6, 1963
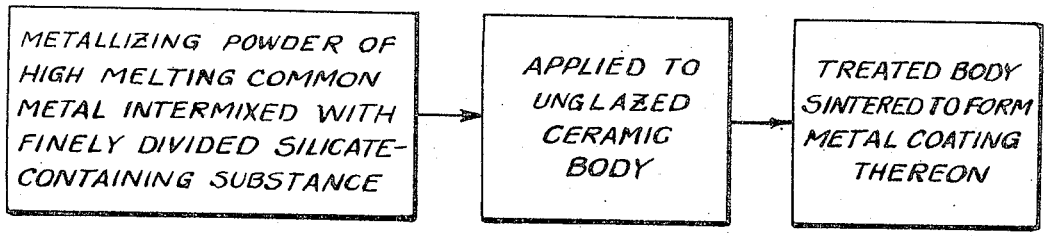
Inventor:
Andreas Meyer.
By [signature] Atty.

United States Patent Office

3,347,704
Patented Oct. 17, 1967

3,347,704
METHOD OF METAL-COATING CERAMIC BODIES
Andreas Meyer, Munich-Allach, Germany, assignor to Siemens & Halske Aktiengesellschaft Berlin and Munich, a corporation of Germany
Filed Dec. 6, 1963, Ser. No. 328,761
Claims priority, application Germany, Dec. 7, 1962, S 82,754
4 Claims. (Cl. 117—227)

The invention disclosed herein relates to the metal-coating of ceramic bodies and is particularly concerned with a method of forming upon an unglazed ceramic body a solderable metal coating, especially for producing vacuum-tight metal-ceramic-connections for electrical discharge vessels, wherein the metallizing powder, which is applied in customary manner, consists of an intimate mixture of a high melting common metal and silicate-containing substances.

The invention is of particular significance in connection with the production of parts of electrical discharge vessels which must be of high quality so far as the mechanical strength and dielectric properties are concerned, and the ceramic bodies of which consist of corundum with at least 98 percent $Al_2O_3$, which is free or nearly free of silicate. However, the invention is also important in connection with corundum ceramic having impurities which for some production reasons vary within a wide range.

There is already a method known for producing vacuum-tight connections between bodies of unglazed ceramic materials and metal, by hard soldering or brazing, after metallizing the ceramic connection points with the aid of high melting common metal powder, whereby silicate-rich substances which are present in the ceramic body or in the metallizing powder are caused to form, by heating, an intermediate layer, especially of silicic acid, such layer effecting firm adhesion of the metallizing layer upon the ceramic support. For this purpose, the ceramic body is in the case of silicate-rich substances subjected to a pre-calcining in vacuum, whereby the outer layers thereof are enriched with silicic acid. The disadvantage in this method, in addition to the technical procedure required for its application, which is relatively complicated, resides in that silicate-rich substances almost always contain metal ions capable of diffusion, which upon calcining penetrate into the ceramic body and detrimentally affect the electrical properties, and in that there is formed a noticeable intermediate layer which considerably reduces the strength of the respective bond.

In connection with another known method of providing upon ceramic bodies a firmly adhering metallizing layer, wherein the placement of the metal is effected by spraying it upon the ceramic body which is heated to nearly the melting temperature of the metal, the ceramic body is prior to the spraying of the metal provided with a non-metallic intermediate layer which establishes an intimate bond or connection therewith, especially a glazing, the softening temperature of which lies in the neighborhood of the melting temperature of the metal to be sprayed thereon, so that such glazing is during the spraying of the metal in softened condition. Glazing layers have the considerable disadvantage that they are very brittle and tend to break off. As in connection with the previously mentioned method, easily diffusible metal ions cause a deterioration of the physical properties of the ceramic and the technical realization of the procedure is relatively complicated, especially by the placement of the metal in liquid condition.

A further method of providing a metallic solderable layer upon glass bodies, quartz glass bodies and generally upon ceramic bodies, proposes to add to the metallizing powder of one or more metals, as a glass forming agent, about 0.1–4 percent of a finely divided acid oxide which is not reducible during the calcining or burning, such as boric acid, phosphoric acid, zirconic acid and especially silicic acid, and to burn it on at a temperature below the melting temperature of the metal. The brittle glazing layer which is thus obtained and the completely insufficient adhesion of the corresponding metallizing layer, are particularly objectionable. Silicic acid, or, more accurately, $SiO_2$, has the considerable disadvantage of neither bonding to the metal particles which are sintered in the reducing atmosphere nor wetting such particles. For these reasons, even additions of silicic acid in considerable amounts do not provide the desired results.

Moreover, boric acid has the disadvantage of producing boric acid-containing glass which in the course of time absorbs water, thereby causing destruction of the connection.

A frequently applied known method of producing upon a ceramic body a metallic coating, which method is effected without addition of non-metallic substances, employing solely a metal powder mixture of 80 percent molybdenum and about 20 percent manganese, is suitable for ceramic material which contains silicate, especially zirconium silicate or magnesium silicate. The sintering is in this method effected in a non-oxidizing atmosphere at 1350° C. in half an hour. However, this method as well as all other previously mentioned methods, fails in the case of ceramic which is free of silicate or contains only small amounts thereof. The metallizing layer obtained is of insufficient strength.

The object underlying the present invention therefore resides in providing a metallizing method which is on the one hand independent of the silicate content of the initial ceramic and suitable for ceramic made of corundum of at least 98 percent $Al_2O_3$ content, especially purest corundum which is free or substantially free of silicate, for the production of parts of electrical discharge vessels having high quality dielectric and mechanical properties, permitting, on the other hand, utilization of a sinter temperature which is as low as possible, namely, somewhat above the sinter temperature of the metal employed or the soldering temperature of the hard solder to be used, respectively.

This object is according to the invention realized, in connection with the initially indicated method, by using as substances which are in finely divided form admixed with the metal powder and form an adhesion phase, silicates which upon sintering do not give off easily diffusible metal ions and which have a low melting point lying above the soldering temperature which is to be utilized.

The foregoing objects and features and further details and features of the invention will appear from the appended claims.

The accompanying drawing shows in block diagram manner the principal steps of the method according to the invention.

The use of silicates which do not give off easily diffusible metal ions prevents migration into the interior of the ceramic, of such metal ions which would reduce the dieletcric properties of the ceramic, as is the case upon using for the formation of the adhesion phase additions of customary glass types. The selected silicate addition serves for the formation of a filling mass with low defined melting point, which filling mass acts upon sintering to nearly wet the metal particles and also the ceramic particles as well as filling the pores of the sinter layer, substantially without producing a noticeable intermediate layer the stability or strength of which is always lower than that of the respective ceramic.

Underlying the invention is the recognition of the fact, based upon extensive systematic investigations, that upon using a manganese-molybdenum mixture as a metallizing powder, the manganese, after having been oxidized, forms upon the sintering, by reaction with the aluminum oxide of the ceramic, a phase of spinel structure, the properties of which corresponding to those of the ceramic, but which does not effect a good wetting either of the ceramic particles or of the metal particles, thus absolutely requiring additionally a well wetting filling mass as it is formed by the admixed silicate, such as is necessary for a well adhering tight connection.

It has further been recognized that for good adhesive strength, the metallizing layer must be completely permeated by the bonding or connection phase. Glazing layers which have been employed in connection with previously known methods are for this reason unsuitable since they do not provide the noted decisive effects. For example, it does not suffice in the case of a ceramic which is free or substantially free of silicate and has an $Al_2O_3$ content of at least 98 percent, to add $SiO_2$ to the metallizing mixture, assuming that the liquid phase will under the sinter conditions be formed, for example, from MnO and $SiO_2$. The MnO would in such case rather effect a spinel formation ($MnOAl_2O_3$) at the border plane. Accordingly, the manganese silicate must be added already as a compound.

Good results are obtained upon using the silicate to be added in an amount of at least 20 percent by weight. It is particularly advantageous to use manganese silicate having a melting point of only 1290° C., so that a temperature of 1250° C. to 1300° C. will suffice for sintering on the metal coating. This temperature is on the one hand high enough so as to exceed the soldering temperature of the most common hard solders and, on the other hand, low enough so as to prevent jeopardizing the shape of the ceramic and to be economical upon using customary sinter furnaces. However, compounds which in part have still a lower melting point, for example, compounds from the three-substance systems $MnO-Al_2O_3-SiO_2$, $$MgO-Al_2O_3-SiO_2$$

as well as $FeO-Al_2O_3-SiO_2$, are particularly suitable for realizing the described method. Of the known high melting common metals, such as iron, nickel, molybdenum, tungsten, etc., molybdenum is particularly suitable for use as a metal coating.

The method according to the invention is advantageously carried out in a weakly oxidizing atmosphere, especially in moist aqueous ammonia split gas, the degree of moisture being thereby in no way critical but can be varied within wide limits since the metal partner, for example, manganese, which reacts with the ceramic, is in oxidic form already present in the manganese silicate. However, a certain amount of weak oxidation agent is necessary in order to avoid a reduction to metal, for example, of the manganese ions contained in the manganese silicate and therewith a decomposition of the silicate. Water vapor has been found particularly suitable as a weak oxidation agent since it also acts to reduce the melting point of the silicate.

The important advantages of the method described herein, as compared with the previously known methods, reside in that a high quality ceramic of purest corundum can be used, the dielectric properties of which are not affected by the sintering, and that the sintering temperature can be reduced by the use of a silicate with low melting temperature which is matched to that of the solder to be respectively employed. A further advantage resides in that the degree of moisture, obtaining upon sintering in moist split gas, need not be exactly maintained but can be varied within wide limits.

The method according to the invention is not inherently limited for use in connection with ceramic with very low silicate content, but also may be applied in connection with ceramic with impurity content varying within wide limits, resulting in such cases in the advantage of enabling working with a low, and above all, with a defined sintering temperature.

Changes may be made within the scope and spirit of the appended claims which define what is believed to be new and desired to have protected by Letters Patent.

I claim:

1. A method of forming upon an unglazed ceramic body a solderable metal coating for use in producing a vacuum tight metal ceramic connection for electrical discharge vessels and the like, comprising the steps of applying on an unglazed ceramic body a metalizing powder consisting of molybdenum powder mixed with at least 20% by weight of a compound selected from the group consisting of manganese silicates and iron silicates, and heating the applied metalized powder to a temperature between 1250° C. to 1350° C. in a relatively weak oxidizing atmosphere.

2. A method of forming a solderable metal coating as defined in claim 1 wherein the heating is performed in an atmosphere of damp ammonia cleavage gas.

3. A method of forming a solderable metal coating as defined in claim 2 wherein said compound is selected from the three-component groups consisting of $$FeO-Al_2O_3-SiO_2$$

4. A method of forming a solderable metal coating as defined in claim 2 wherein said compound is selected from the three-component groups consisting of $$MnO-Al_2O_3-SiO_2$$

References Cited

UNITED STATES PATENTS

| | | | |
|---|---|---|---|
| 2,814,571 | 11/1957 | Iversen | 117—22 |
| 2,903,788 | 9/1959 | Pryslak | 29—473.1 |
| 3,110,571 | 11/1963 | Alexander | 117—22 X |
| 3,189,476 | 6/1965 | Cowan | 117—227 |
| 3,241,995 | 3/1966 | Pulfrich et al. | 117—22 |
| 3,289,291 | 12/1966 | Reed | 106—1 X |
| 3,290,171 | 12/1966 | Zollman et al. | 117—71 X |

ALFRED L. LEAVITT, *Primary Examiner.*

J. R. BATTEN, *Assistant Examiner.*